United States Patent [19]

Nagano

[11] Patent Number: 5,060,537

[45] Date of Patent: * Oct. 29, 1991

[54] BICYCLE PEDAL AND CLAMPING DEVICE THEREFOR

[75] Inventor: Masashi Nagano, Osaka, Japan

[73] Assignee: Shimano Industrial Co., Ltd., Osaka, Japan

[*] Notice: The portion of the term of this patent subsequent to May 29, 2007 has been disclaimed.

[21] Appl. No.: 404,531

[22] Filed: Sep. 8, 1989

[30] Foreign Application Priority Data

Sep. 9, 1988 [JP] Japan .................... 63-226982

[51] Int. Cl.⁵ .............................. G05G 1/14
[52] U.S. Cl. .................. 74/594.6; 74/594.4; 36/131
[58] Field of Search ............ 36/131, 132; 74/594.4, 74/594.6, 560; 280/11.30–11.34

[56] References Cited

U.S. PATENT DOCUMENTS

| 4,686,867 | 8/1987 | Bernard et al. | 36/131 X |
| 4,762,019 | 8/1988 | Beyl | 36/131 X |
| 4,898,064 | 2/1990 | Romano | 36/131 X |
| 4,928,549 | 5/1990 | Nagano | 74/594.6 |

FOREIGN PATENT DOCUMENTS

| 8523216 | 3/1987 | Fed. Rep. of Germany | 74/594.6 |
| 3831036 | 3/1989 | Fed. Rep. of Germany | 74/594.6 |
| 3831040 | 3/1989 | Fed. Rep. of Germany | 74/594.6 |
| 2620409 | 9/1988 | France | 74/594.6 |

Primary Examiner—Vinh T. Luong
Attorney, Agent, or Firm—Edwin E. Greigg; Ronald E. Greigg

[57] ABSTRACT

A bicycle pedal including clamping device for fastening an engageable article to the pedal. The clamping device comprises a clamp member including an engaging hook pivotable toward and away from one end of a pedal body for engaging the engageable article, and an urging member for urging the hook toward the pedal body. When the engageable article is moved sideways relative to the pedal body, the hook pivots away from the pedal body to release the engageable article. The clamping device further comprises an upward pull selector for selectively allowing the hook to pivot away from the pedal body when the engageable article is pulled upwardly relative to the pedal body. This selector is switchable between a position for prohibiting the engageable article from being pulled upward, thereby avoiding a danger resulting from disengagement of the engageable article from the pedal body, and a position for allowing the engageable article to be pulled upward with ease.

12 Claims, 5 Drawing Sheets

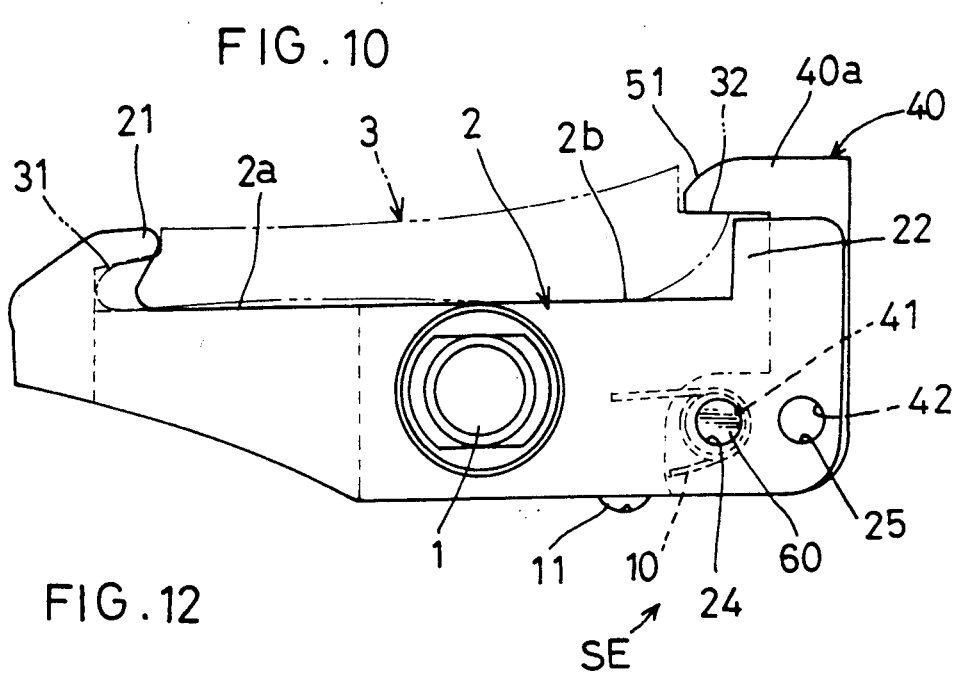
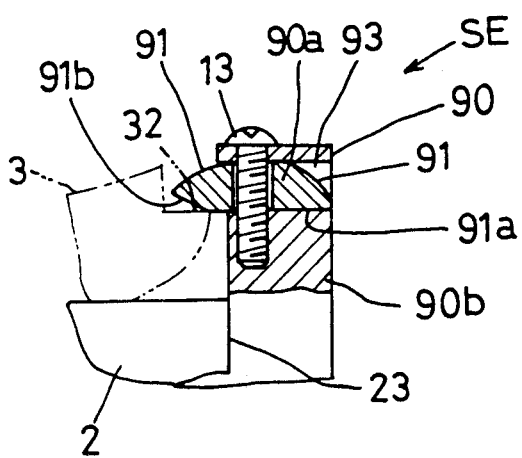
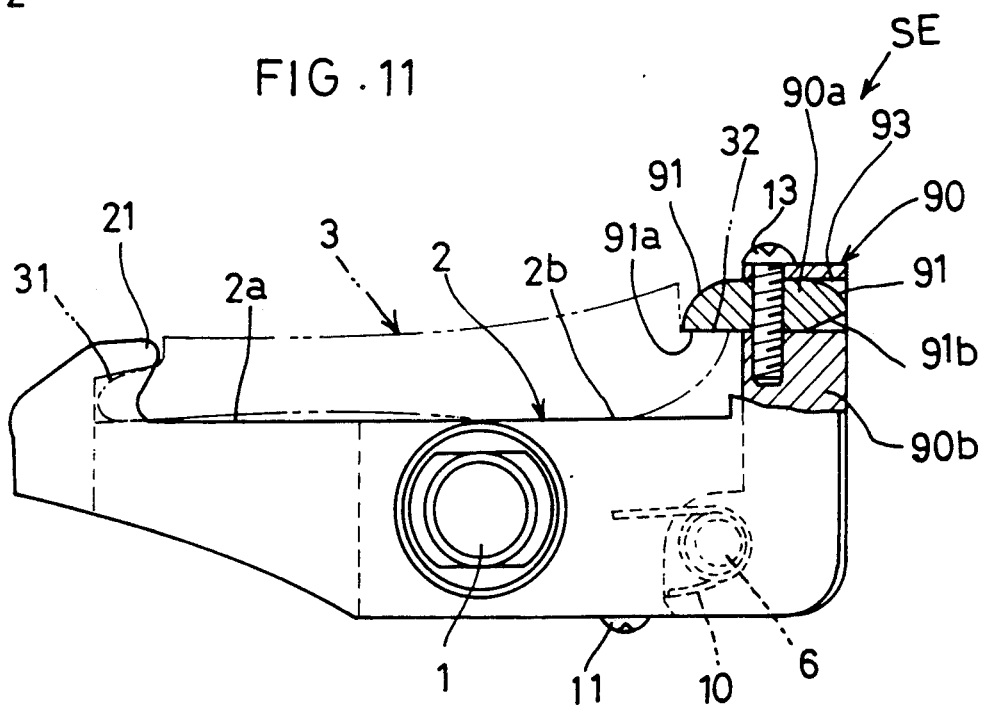

BICYCLE PEDAL AND CLAMPING DEVICE THEREFOR

BACKGROUND OF THE INVENTION

1. Field of the Invention

The present invention relates to a clamping device for a bicycle pedal for fastening an engageable article such as a cleat to the pedal, and to a bicycle pedal employing this clamping device. More particularly, the invention relates to a clamping device and a bicycle pedal employing this clamping device, the clamping device comprising a clamp member including a hook pivotable toward and away from a forward or rear end of a pedal body for engaging the engageable article, an urging member for urging the hook toward the pedal body, and a pivot restrictor for limiting the pivotal movement of the hook toward the pedal body. When the engageable article is moved sideways relative to the pedal body, the hook pivots away from the pedal body for releasing the engageable article.

2. Description of the Prior Art

An example of known clamping devices of bicycle pedals is disclosed in Japanese Patent Publication Kokai No. 60-197478, which is the same as U.S. Pat. No. 4,686,867. This device comprises a forward clamp member for fastening an engageable article or cleat secured to the bottom of a shoe, to a forward end of a pedal body rotatably supported on a pedal shaft. The pedal body carries, at a rear end thereof, a rear clamp member pivotable rearwardly from the pedal body. The rear clamp member is operable through interference with the cleat when the pedal body is trodden, to engage a rear end of the cleat. A compression spring is mounted between the rear clamp member and the pedal body to urge the rear clamp member forwardly.

With the known clamping device, when detaching the cleat from the pedal, the shoe is turned right or left on the same plane as the pedal body about a point of engagement with the forward clamp member. This causes the rear clamp member to pivot rearwardly against the force of the compression spring, thereby to release the rear end of the cleat. That is, in order to avoid a danger resulting from detachment of the cleat from the pedal body during a high-speed run, the cleat is detachable from the pedal body only by sideways turning of the cleat relative to the pedal body, without allowing the cleat to pull upward away from the pedal body.

However, there are users who strongly desire a clamping device which readily allows the cleat to pull upward out of engagement with the pedal body on certain occasions. The foregoing clamping device known in the art cannot meet such demand. Since the rear clamp member of the known device is itself constructed to prevent upward detachment of the cleat, it is extremely difficult for the cleat to be detached upwardly even if the urging force of the compression spring is reduced.

SUMMARY OF THE INVENTION

An object of the present invention is to provide a clamping device of a bicycle pedal which prevents the engageable article from becoming detached from the pedal body during a high-speed run while allowing the engageable article to disengage sideways from the pedal body, and which allows the engageable article to pull upwardly from the pedal body with ease when the user so desires. The invention also intends to provide a bicycle pedal employing this clamping device.

A clamping device for fastening an engageable article to a bicycle pedal, according to the present invention, comprises a clamp member provided at a front or rear of a pedal body and including a hook for engaging the engageable article, the hook being pivotable toward and away from the pedal body, urging means for urging the hook toward the pedal body, pivot limiting means for limiting pivotal movement of the hook toward the pedal body, the hook being pivotable away from the pedal body is release the engageable article when the engageable article is moved sideways relative to the pedal body, and an upward pull selector for selectively allowing the hook to pivot away from the pedal body when the engageable article is pulled upwardly relative to the pedal body.

With the above construction, when the engageable article is attached to the pedal body, the engageable article is engaged by the hook of the clamp member which is restricted by the upward pull selector against pivoting away from the pedal body. Consequently, the engageable article cannot be pulled upwardly out of engagement, to avoid the danger resulting from the engageable article disengaging from the pedal body during a high-speed run. Besides, when the engageable article is moved sideways relative to the pedal body, the hook pivots away from the pedal body to release the engageable article. This construction thus allows the engageable article to be released sideways by turning sideways on the same plane relative to the pedal body, which ensures safety even when the bicycle turns over with the hook restricted against pivoting away from the pedal body. On the other hand, the upward pull selector is operable to allow the hook to pivot away from the pedal body. The engageable article may thus pull upwardly out of engagement with ease.

Preferably, the upward pull selector includes an axis for supporting the hook to be pivotable relative to the pedal body, the axis being located in a position to produce a torque for causing the hook to pivot about the axis away from the pedal body when the engageable article is pulled upwardly relative to the pedal body, and a selecting mechanism for selectively allowing the hook to pivot about the axis.

With this construction, the selecting mechanism included in the upward pull selector is operable to prevent the hook from pivoting about the axis for prohibiting the upward pulling of the engageable article. When the selecting mechanism is operated to allow the hook to pivot about the axis, the upward pulling of the engageable article relative to the pedal body causes the hook to pivot away from the pedal body. The pivotal movement of the hook about the axis releases the engagable article for pulling upward with ease.

Further, the present invention provides a bicycle pedal employing the clamping device as constructed above.

Thus, the present invention provides a clamping device and a bicycle pedal having this clamping device which allow the engageable article to be disengaged sideways from the pedal body, prevents the engageable article from becoming disengaged from the pedal body during a high-speed run, and, when the user so desires, allows the engageable article to be pulled upwardly out of engagement.

Other objects, features and advantages of the invention will be apparent from the following description of the embodiments.

BRIEF DESCRIPTION OF THE DRAWINGS

The drawings show embodiments of the present invention, in which:

FIGS. 10 through 12 are views illustrating different embodiments of the invention.

DESCRIPTION OF THE PREFERRED EMBODIMENTS

An embodiment of the present invention will be described hereinafter with reference to the drawings.

Figure 3:
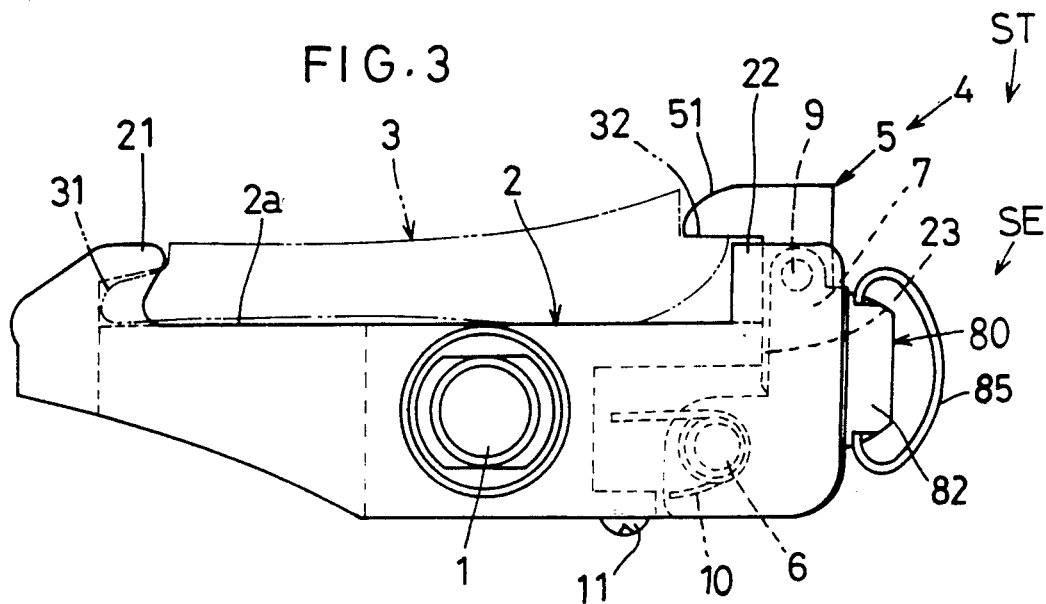
FIG. 3 is a side view of the selecting mechanism.
Figure 4:
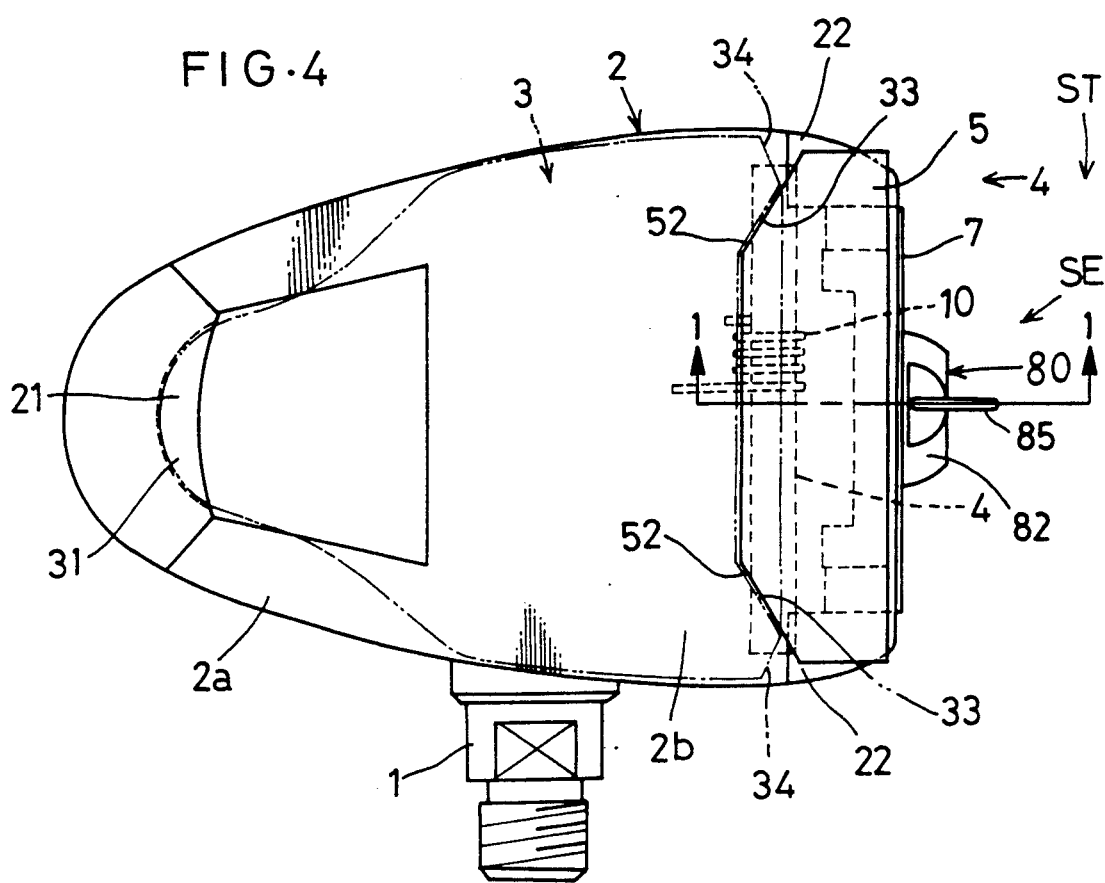
FIG. 4 is a plan view of the selecting mechanism.

Referring to FIGS. 3 and 4, number 1 indicates a pedal shaft attached to the free end of a crank arm of a bicycle clutch, and number 2 indicates a pedal body rotatably supported by the pedal shaft 1. The pedal body 2 comprises a horseshoe-shaped forward tread 2a extending forwardly from a position thereof supported by the pedal shaft 1, and a rear tread 2b extending rearwardly from the supported position and including opposite lateral walls. The pedal body 2 has lateral walls depending from the rear tread 2b.

Number 3 in FIGS. 3 and 4 indicates an engageable article or cleat attached to the bottom of a shoe. The cleat 3 includes an approximately semicircular forward engaging end 31. Further, the cleat 3 includes a rear engaging end portion 32 formed thin with a top indentation extending over a intermediate range transversely of the cleat 3. At opposite lateral sides of the rear engaging portion 32 are inclined walls 33 which are continuous with arcuate surfaces 34, respectively.

The pedal body 2 includes stopper pieces 22 at opposite rear sides thereof for preventing the cleat 3 from moving rearwardly relative to the pedal body 2. These stopper pieces 22 project vertically from rear lateral sides of the rear tread 2b to be opposed to the arcuate surfaces 34 provided at the rear of the cleat 3. When a pedal kick-up action of the cyclist applies a rearward force to the cleat 3, the arcuate surfaces 34 of the cleat 3 contact the stopper pieces 22, thereby preventing rearward movement of the cleat 3.

Figure 1:
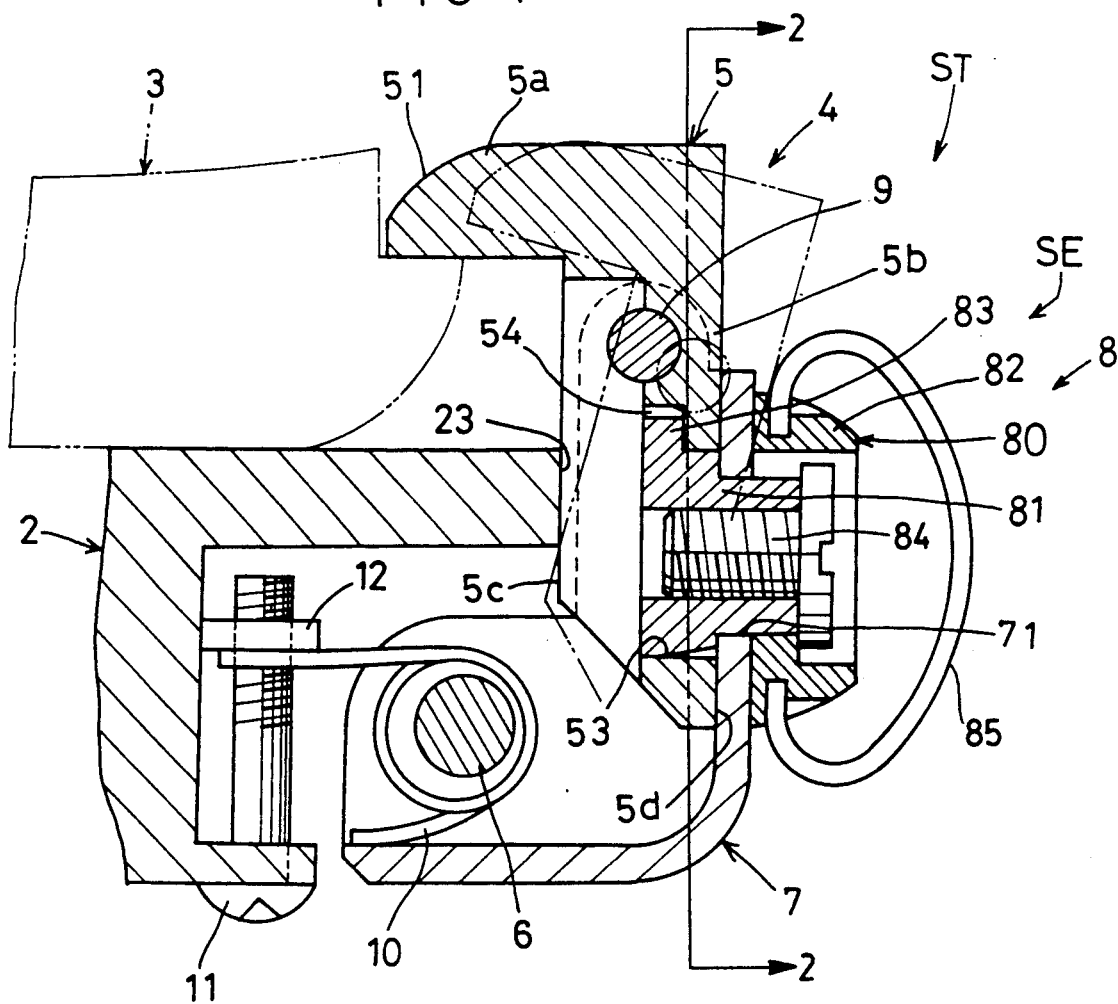
FIG. 1 is a sectional view along lines 1—1 of FIG. 4 of a principal portion of a clamping device of a bicycle pedal according to the invention.
Figure 2:
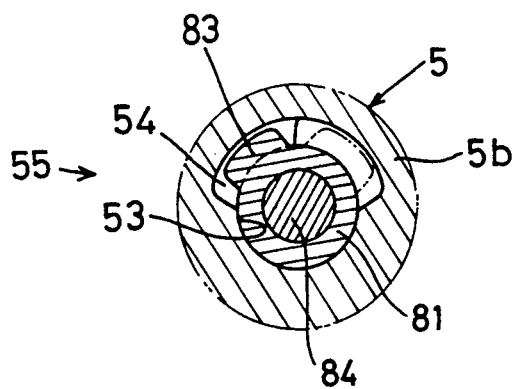
FIG. 2 is a partial sectional view of a selecting mechanism taken along line 2—2 of FIG. 5.

FIG. 1 shows details of a clamping mechanism ST provided at the rear of the pedal body 2 for clamping the cleat 3. The clamping mechanism ST includes a rear clamp member 4, a presser spring 10 acting as an urging means, a contact surface 23 acting as pivot limiting means, and an upward pull selector SE. The rear clamp member 4 is divided into an oscillatable member 7 and a movable hooking member 5 having a hook 5a. The hooking member 5 is pivotably supported by the oscillatable member 7 through a first axis 9, and the oscillatable member 7 is in turn pivotably supported by the pedal body 2 through a second axis 6. The upward pull selector SE which will be described in detail hereinafter is mounted between the oscillatable member 7 and the movable hooking member 5.

Figure 5:
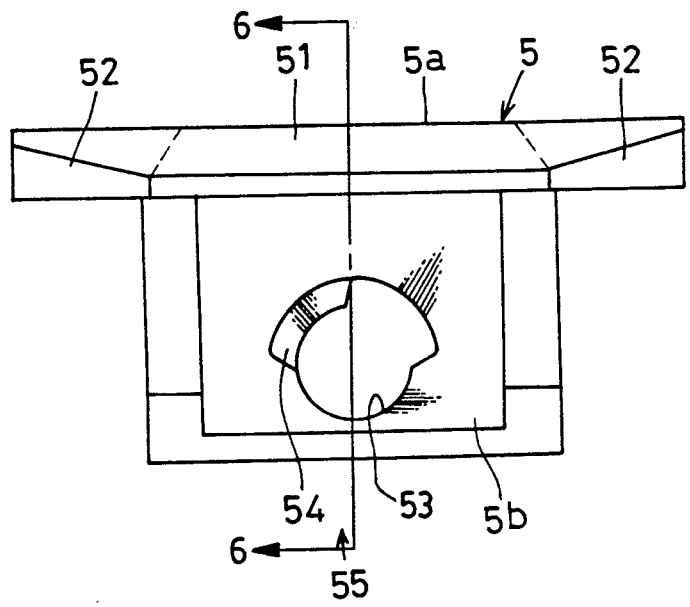
FIG. 5 is a side view of a removable hooking member.
Figure 6:
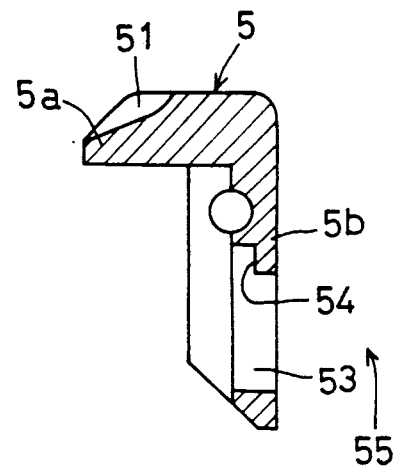
FIG. 6 is a side view in vertical section of the hooking member taken along line 6—6 of FIG. 5.

As shown in FIGS. 5 and 6, the hooking member 5 includes the hook 5a extending transversely of the pedal body 2, and a plate-like body 5b extending downwardly from the hook 5a. The hook 5a is vertically opposed to the rear tread 2b with a spacing there-between. The hook 5a defines an upper surface 51 inclined forwardly downwardly. Further, the hook 5a defines control surfaces 52 at opposite lateral positions thereof for engaging one of the inclined walls 33 and moving the hooking member 5 rearwardly relative to the cleat 3 when the cleat 3 is turned sideways, thereby to place the hook 5a and the rear engaging portion 32 out of engagement with each other.

Figure 7:
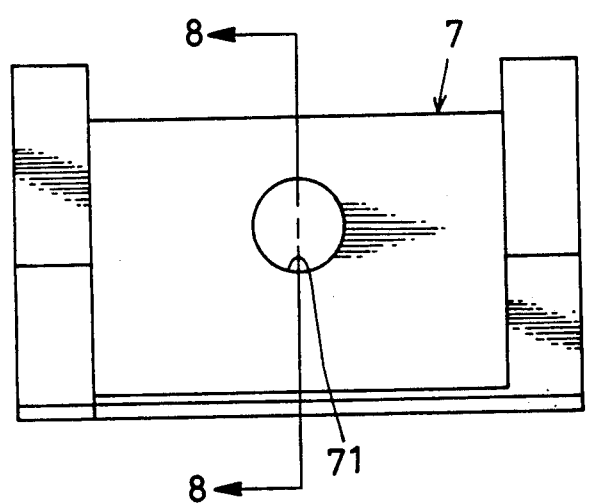
FIG. 7 is a side view of an oscillatable member.
Figure 8:
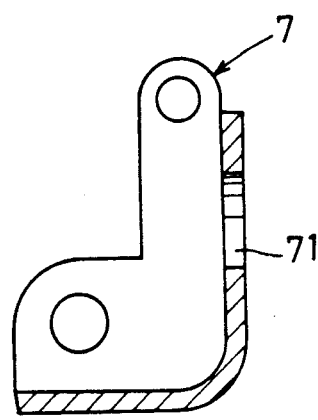
FIG. 8 is a side view in vertical section of the scillatable member taken along lines 8—8 of FIG. 7.
Figure 9:
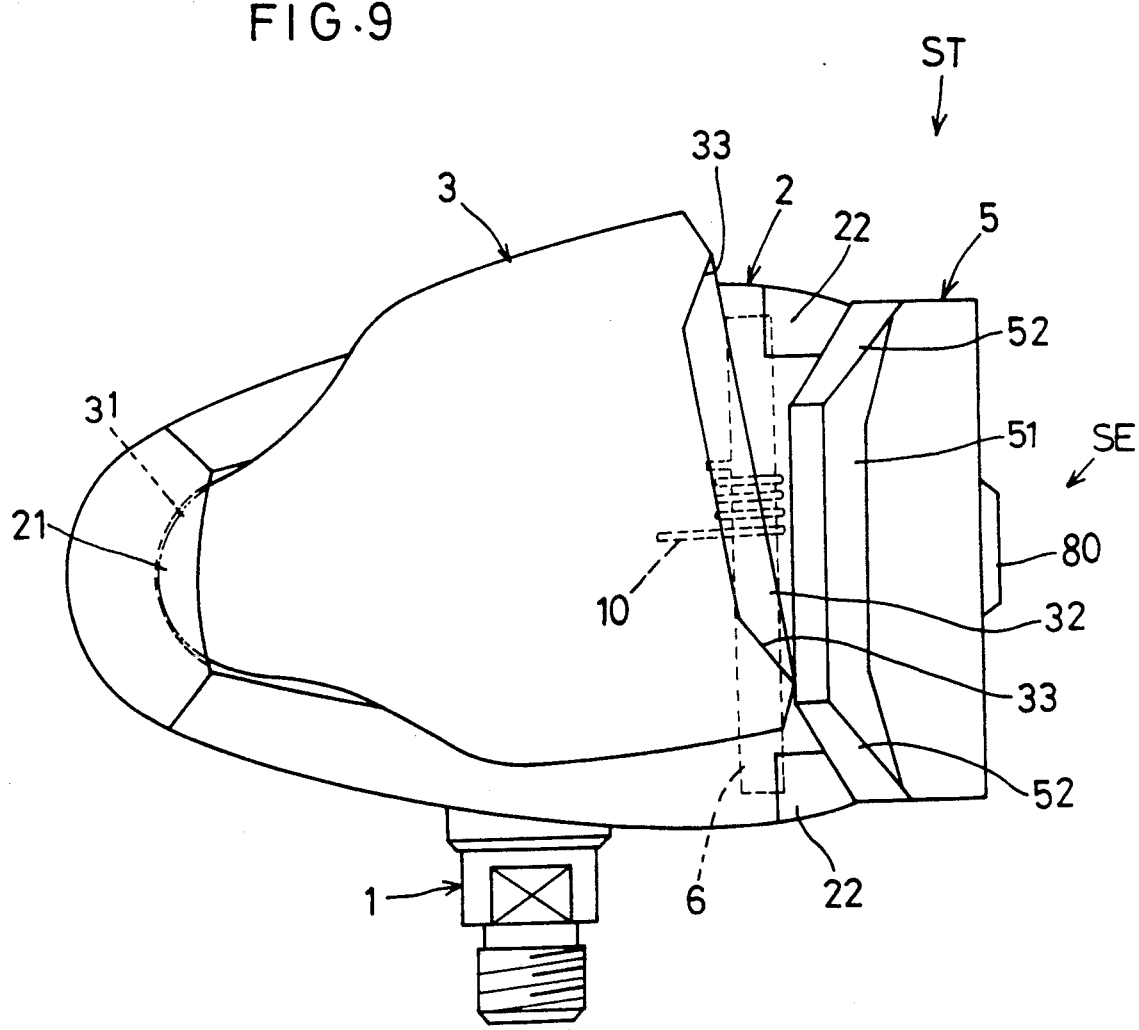
FIG. 9 is a view illustration an operative state.

As shown in FIGS. 7 and 8, the oscillatable member 7 comprises an approximately L-shaped plate with lateral walls. As shown in FIG. 1, the oscillatable member 7 is pivotally supported at one end thereof by a second axis 6 extending between lower positions of the lateral walls of the rear tread 2b of the pedal body 2.

As shown in FIG. 1, the presser spring 10 comprises a torsion coil spring having a coiled intermediate portion and tangentially extending opposite ends, for urging the oscillatable member 7 toward the pedal body 2. The coiled intermediate portion of this spring is supported on the second axis 6, with one end engaging the oscillatable member 7 and the other end positionally adjustably contacting the pedal body 2. The pedal body 2 includes an adjusting screw 11 which is rotated to adjust the force of the spring 10. More particularly, the adjusting screw 11 is attached in a vertical posture to a bottom position of the pedal body 2 to be only rotatable, and a spring bearing 12 engaging the other end of the presser spring 10 is meshed with the adjusting screw 11 to be movable relative to the pedal body 2. The spring bearing 12 is vertically movable with turning of the adjusting screw 11 to adjust the force of the presser spring 10.

The second axis 6 is located right under the position of engagement between the hooking member 5 and the rear engaging portion 32, so that the hooking member 5 is not pivotable relative to the oscillatable member 7 when the cleat 3 is pulled upward relative to the pedal body 2 after the upward pull selector SE is operated as described later to prohibit the pivotal movement of the hooking member 5 relative to the oscillatable member 7. In other words, an upward force applied to the position of engagement between the hooking member 5 and the rear engaging portion 32 does not produce a torque for causing the rear clamp member 4 locked into one piece by operating the upward pull selector SE to oscillate about the second axis 6.

The upward pull selector SE is operable to allow the hooking member 5 to pivot relative to the oscillatable member 7 when the cleat 3 is pulled upward relative to the pedal body 2. For this purposes, the first axis 9 is located rearwardly of a line extending from the position of engagement between the hooking member 5 and the rear engaging portion 32 to the second axis 6. In other words, an upward force applied to the position of engagement between the hooking member 5 and the rear engaging portion 32 produces a torque for causing the hooking member 5 to pivot about the first axis 9.

The hooking member 5 is urged toward the contact surface 23 by the presser spring 10 whose force is transmitted thereto through the oscillatable member 7. The pivotal or oscillatory movement toward the pedal body 2 of the hooking member 5 and oscillatable member 7, under the urging force, is limited by contact between the contacting surface 23 and a front contact portion 5c of the hooking member 5 located below the first axis 9 and by contact between a rear and lower contact portion 5d of the hooking member 5 and an inside surface adjacent a distal end of the oscillatable member 7. The contact portion 5c, which forms part of the upward pull selector SE, transmits the urging force of the presser spring 10 to the hook 5a by means of leverage with the first axis 9 serving as the function as described later.

The upward pull selector SE includes a selecting mechanism 8 which includes a selecting element 80 and a selected bore 55. The selecting element 80 includes a shank 81, a control portion 82 provided at one end of the shank 81, and a cam 83 provided at the other end of the shank 81. The shank 81 is rotatably supported in an opening 71 defined adjacent the distal end of the oscillatable member 7. The selecting bore 55 includes a non-circular perforation 53 defined in the body 5b of the hooking member 5 and corresponding to the cam 83, and an engaging recess 54 continuous with the perforation 53. The selecting element 80 extends through the opening 71 and perforation 53, and the cam 83 is engageable with the engaging recess 54 by turning the control portion 83. The engagement between the cam 83 and the engaging recess 54 rigidly interconnects the hooking member 5 and the oscillatable member 7 to prevent the pivotal movement of the hooking member 5 relative to the oscillatable member 7. Even if the cleat 3 is lifted in this state, the hooking member 5 an oscillatable member 7 are not oscillatable rearwardly. The hooking member 5 becomes pivotable relative to the oscillatable member 7 by disengaging the cam 83 from the engaging recess 54 and displacing the cam 83 into register with perforation 53. When the cleat 3 is lifted in this state, the hooking member 5 pivots relative to the oscillatable member 7 which oscillates relative to the pedal body 2. It is to be noted that the selecting element 80 has the shank 81 and cam 83 formed integral, and the control portion 82 formed separately from and connected to the shank 81 through a connecting screw 84. The control portion 82 is disposed on the side not opposed to the pedal body 2, to enable the cyclist to operate the selecting mechanism 8 without dismounting from the bicycle by use of a ring portion 85.

How the described clamping mechanism operates will be described next.

First, when attaching the cleat 3 of a shoe to the pedal, the cyclist engages the forward engaging end 31 of the cleat 3 with the forward clamp member 21 of the pedal body 2, and forms his or her foot down with the undersurface of the rear engaging portion 32 contacting the inclined surface 51 of the hooking member 5. While the hooking member 5 may be placed in the pivotable state relative to the oscillatable member 7 at this time, the operation will be described herein with reference to the state in which the upward pull selector SE locks the hooking member 5 against the pivotal movement relative to the oscillatable member 7.

Forcing the foot down causes the rear clamp member 4 with the hooking member 5 and oscillatable member 7 rigidly interconnected to oscillate rearwardly against the force of the presser spring 10. Subsequently, the undersurface of the rear engaging portion 32 moves out of contact with the tip end of the hook 5a. Then the presser spring 10 moves back the oscillatable member 7 and, as shown in FIGS. 3 and 4, the hook 5a of the hooking member 5 engages the rear engaging portion 32 of the cleat 3. The cleat 3 is thus caught immovable by the rear clamp member 4. Since the cleat 3 cannot be pulled upward with the oscillatable member 7 pivotally supported right under the hook 5a, a pedal kick-up action of the cyclist does not result in the hooking member 5 escaping upwardly of the pedal body 2. Consequently, the cleat 3 is reliably maintained in the fastened position.

Secondly, when pulling out the cleat 3 sideways, the cyclist turns the shoe sideways on the same plane about the engagement of the cleat 3 with the forward clamp member 21. The resulting force is applied through an inclined wall 33 of the cleat 3 to a control surface 52 of the hooking member 5. This turning force imparts a rearward component of force to the control surface 52, whereby the hocking member 5 oscillates in unison with the oscillatable member 7 against the force of the presser spring 10. As a result, the hook 5a disengages from the rear engaging portion 32 to allow the cleat 3 to pull out laterally outwardly.

Thirdly, when pulling the cleat 3 out upwardly, the upward pull selector SE is operated to move the cam 83 of the selecting element 80 into register with the perforation 53 defined in the hooking member 5 to render the hooking member 5 pivotable relative to the oscillatable member 7. Then the shoe is strongly pulled upward about the position of engagement between the cleat 3 and the forward clamp member 21. This pulling force is applied from the rear engaging portion 32 of the cleat 3 to the hooking member 5. The pulling force then urges the contact portion 5c of the hooking member 5 contacting the contact surface 32 to pivot upwardly and rearwardly about the first axis 9. At this time, the pivotal movement of the hooking member 5 is substantially restricted by the contact between its rear surface 5d and the forward face of the oscillatable member 7. Therefore, the force rearwardly urging the hooking member 5 is transmitted to the oscillatable member 7 by a lever action with the point of contact on the contact surface 23 serving as the fulcrum, thereby rearwardly oscillating the oscillatable member 7. That is, while the hooking member 5 pivots rearwardly, the oscillatable member 7 follows this pivotal movement and oscillates rearwardly, and finally the cleat 3 becomes disengaged. The upward pulling force applied to the cleat 3 causes the hooking member 5 to pivot to a greater extent than the oscillation of the oscillatable member 7, thereby disengaging the hooking member 5 from the rear engaging portion 32. The hooking member 5 is thus readily disengageable from the rear engaging portion 32 by the upward pulling force applied to the cleat 3 even where the spring 10 is set to impart a sufficient force to prevent the hooking member 5 from pivoting upwardly with respect to the pedal body 2 as a result of a pedal kick-up action occuring when the cyclist is pedaling. The cleat 3 is thus readily attachable and upwardly detachable with such spring force setting as well. When the cleat 3 allowed to pull upwardly as above is turned sideways on the same plane, the cleat 3 may be pulled out sideways with the hooking member 5 pivoting rearwardly as already described.

With the upward pull selector SE constructed as above, a high degree of freedom is provided for designing since the force required for attaching and detaching the cleat 3 may be varied by varying the position of pivotal connection between the hooking member 5 and oscillatable member 7 toward or away from the position of contact between the hooking member 5 and contact surface 23. More particularly the cleat 3 is easily attachable but not easily detachable upwardly where the position of pivotal connection of the hooking member 5 is located farther from the position of contact between the hooking member 5 and contact surface 23 than is shown in FIG. 1 to reduce the leverage or lever ratio of the hooking member 5, that is to reduce the ratio of the distance between the pivotal connection of the hooking member 5 and its contact with the rear engaging portion 32 of the cleat 3 with respect to the distance between the pivotal connection and the contact surface 23, with the force of the spring 10 reduced. Conversely, the cleat 3 is not easily attachable but easily detachable upwardly where the position of pivotal connection of the hooking member 5 is located closer to the position of contact between the hooking member 5 and contact surface 23 than is shown in FIG. 1 to increase the leverage of the hooking member 5. Further, the cleat 3 is readily attachable and detachable where the above leverage is increased and the force of the spring 10 is reduced. Thus, the upward pull selector SE as constructed above allows selection of the leverage and spring force to facilitate various designing.

Other embodiments of the present invention are listed below.

I. In connecting the hooking member 5 to the pedal body 2 through the oscillatable member 7, the hooking member 5 may have some play with respect to the oscillatable member 7. That is, hooking member 5 need not be in contact with the contact surface 23 all the time. In this case, the oscillatable member 7 is placed in contact with the contact surface 23. Then, when attaching the cleat 3, the hooking member 5 is prevented from pivoting toward the pedal body 2 until the hooking member 5 contacts the contact surface 23.

II. In the foregoing embodiment, the pedal body 2 includes the contact surface 23 acting as the pivot limiting means for stopping the pivotal movement of the hooking member 5 toward the pedal body 2. However, the pivot limiting means is not limited to such construction, but may take any other forms only if effective to stop the pivotal movement of the hooking member 5 toward the pedal body 2 when attaching the cleat 3.

III. In the foregoing embodiment, the rear clamp member 4 consists of the oscillatable member 7 supported by the pedal body 2 and the hooking member 5 pivotably supported by the oscillatable member 7 through the first axis 9 and having the hook 5a, and the upward pull selector SE includes the selecting mechanism 8 for selectively allowing the pivotal movement of the hooking member 5 relative to the oscillatable member 7. This upward pull selector SE may be modified in many ways.

One modified example is shown in FIG. 10. As seen, the pedal body 2 defines, in a rear portion thereof, two bores 24 and 25 spaced from each other in the fore and aft direction. One of the bores 24 is located right under the position of engagement between a rear clamp member 40 and the engaging portion 32, while the other bore 25 is located rearwardly of the bore 24. The rear clamp member 40 defines bores 41 and 42 opposed to the bores 24 and 25, respectively. An axis 60 is provided for pivotally supporting the rear clamp member 40. When the axis 60 is placed to extend through the forward bores 24 and 41, the cleat 3 may be released by turning sideways but not by pulling upward. When the axis 60 is pulled out of the forward bores 24 and 41 and inserted into the rearward bores 25 and 42, a pulling force applied to the cleat 3 acts on a hook 40a of the rear clamp member 40 and produces a torque for causing the rear clamp member 40 to pivot on the axis 60, whereby the cleat 3 may be pulled upward.

In this example, the spring 10 may be moved with the axis 60. The spring bearing 12 as shown in FIG. 1 may be extended further rearwardly with respect to the pedal body 2. Then the spring bearing 12 can engage one end of the spring 10 at all times.

IV. FIGS. 11 and 12 show a further example of the upward pull selector SE. In this example, the rear clamp member 90 is divided into an engaging hook 90a and a body portion 90b. The hook 90a defines a flat engaging surface 91 at one end thereof extending in the same direction in which the cleat 3 is turned sideways for disengagement, and an inclined engaging surface at the other end which is inclined outwardly upwardly. The body portion 90b defines a retaining bore 93 in a top position thereof for accommodating the hook 90a. The hook 90a is mounted in the retaining bore 93 to be rotatable by a mounting screw 13. When the flat engaging surface 91a is used, the cleat 3 may be released by turning sideways but cannot be pulled upward. When the hook 90a is reversed to use the inclined engaging surface 91b, the cleat 3 may be pulled upward out of engagement.

V. In the foregoing embodiment, the clamping mechanism ST is provided at the rear of the pedal body 2. Instead, the clamping mechanism may be provided at the front or at both the front and rear of the pedal body 2.

VI. In the foregoing embodiment, the rear clamp member 4 is pivotally connected to the pedal body 2 through the second axis 6. The pivotal connection, however, is not limited to the use of such an axis.

VII. In the foregoing embodiment, the selecting mechanism 8 includes the selecting element 80 and selecting bore 53 engageable with each other. This mechanism may be varied as desired only if it selectively allows the hooking member 5 to pivot relative to the oscillatable member 7.

In the modified construction described in paragraph III above, the selecting mechanism comprises the arrangement for selectively placing the axis 60 in the forward bores 24 and 41 and the rearward bores 25 and 42.

VIII. In the foregoing embodiment, the urging means 10 comprises a torsion coil spring, but may be a compression coil spring, a plate spring or the like.

IX. The foregoing embodiment includes the mechanism for allowing the cleat 3 to become disengaged sideways by turning the shoe sideways on the same plane and about the position of engagement between the cleat 3 and the forward clamp member 21. Alternatively, the mechanism may be modified for allowing the disengagement by moving the shoe sideways parallel to the pedal shaft 1 without turning the shoe.

X. In the foregoing embodiment, the engageable article 3 comprises a cleat. However, such an article may be a shoe plate attached to a shoe, an attaching device integral with a shoe, or various other articles.

What is claimed is:

1. A bicycle pedal including a clamping device for securing a shoe of a cyclist onto said pedal by a cleat on the shoe, said bicycle pedal including a pedal body pivotably supported by a pedal shaft, said clamping device being mounted on said pedal body for clamping the cleat of the shoe to the pedal body, a pivotable clamp member including a pivotable hook member at one end of the pedal body for engaging said cleat at one end of the pedal body of the shoe, said clamp member being pivotable about a second axis to move the pivotable hook member in directions toward and away from the pedal body, pivot limiting means for limiting pivotal movement of said pivotable clamp member toward said pedal body, urging means for urging said pivotable clamp member toward said pedal body, said pivotable clamp member being pivotable about said second axis to move away from said pedal body thereby to permit disengagement of said cleat of the shoe when said cleat of the shoe is moved sideways relative to said pedal body, said pivotable hook member being pivotable about a first axis parallel to and displaced from said second axis, said first axis being so positioned to permit oscillation of said pivotable hook member in a direction away from said pedal body when said cleat of the shoe is pulled upwardly, and upward pull selector means for selectively allowing said pivotable hook member to pivot about said first axis.

2. A bicycle pedal including a clamping device as claimed in claim 1, wherein said clamp member includes an oscillatable member pivotable about said second axis, and said pivotable hook member having said hook is supported by said oscillatable member through said first axis, and said upward pull selector means (SE) selectively allows said pivotable hook member to pivot about said first axis relative to said oscillatable member.

3. A bicycle pedal having a clamping device as claimed in claim 2, further comprising:
    a forward clamp member for fastening said cleat of said shoe to a front end of said pedal body,
    said clamping device being operable to engage said cleat of said shoe at a rear end of said pedal body.

4. A bicycle pedal including a clamping device as claimed in claim 2, wherein said pivotable hook member includes a contact portion on a portion disposed opposite to a hook end with respect to said first axis for contacting a portion of said pedal body with a pivotal movement of the oscillatable member when said pivotable hook member pivots relative to said oscillatable member.

5. A bicycle pedal having a clamping device as claimed in claim 4, further comprising:
    a forward clamp member for fastening said cleat of said shoe to a front end of said pedal body,
    said clamping device being operable to engage said cleat of said shoe at a rear end of said pedal body.

6. A bicycle pedal including a clamping device as claimed in claim 1 wherein said urging means further urges a portion of said pivotable clamp member including at least said pivotable hook member toward said pedal body about said first axis.

7. A bicycle pedal having a clamping device as claimed in claim 1, further comprising:
    a forward clamp member for fastening said cleat of said shoe to a front end of said pedal body,
    said clamping device being operable to engage said cleat of said shoe at a rear end of said pedal body.

8. A bicycle pedal including a clamping device as claimed in claim 7, wherein said selector means includes a control portion disposed opposite said pedal body across said pivotable hook member for controlling said selecting mechanism.

9. A bicycle pedal including a clamping device as claimed in claim 8, wherein said selector means further includes a selecting shaft rotatably extending in a fore and aft direction through said pivotable hook member, and a selecting bore defined in said pivotable hook member for receiving said selecting shaft, said selector means being operable to select between engagement and disengagement of said selecting shaft and said selecting bore by turning said control portion.

10. A bicycle pedal having a clamping device as claimed in claim 9, further comprising:
    a forward clamp member for fastening said cleat of said shoe to a front end of said pedal body,
    said clamping device being operable to engage said cleat of said shoe at a rear end of said pedal body.

11. A bicycle pedal having a clamping device as claimed in claim 8, further comprising:
    a forward clamp member for fastening said cleat of said shoe to a front end of said pedal body,
    said clamping device being operable to engage said cleat of said shoe at a rear end of said pedal body.

12. A bicycle pedal including a clamping device as claimed in claim 8 wherein said upward pull selector means (SE) includes a selecting element mounted on said oscillatable member, said selecting element having a cam portion disposed at an extreme end thereof pivotably operable through said control portion, and a selecting bore defined in said pivotable hook member for receiving said selecting element and being engageable with said cam portion with operation of said control member.

* * * * *